(12) United States Patent
Oharu et al.

(10) Patent No.: US 6,315,822 B1
(45) Date of Patent: Nov. 13, 2001

(54) PHOSPHATE TYPE WATER AND OIL REPELLENT COMPOSITION

(75) Inventors: Kazuya Oharu; Minako Shindo, both of Kanagawa (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/435,208

(22) Filed: Nov. 5, 1999

(30) Foreign Application Priority Data

Nov. 10, 1998 (JP) .................................................. 10-319544

(51) Int. Cl.$^7$ .............................. C09K 3/18; D21H 17/11; C14C 9/00
(52) U.S. Cl. .............................. 106/2; 252/8.57; 427/389; 427/391; 428/473; 428/537.5
(58) Field of Search ................................ 252/8.57; 106/2; 437/389, 391; 428/473, 537.5

(56) References Cited

U.S. PATENT DOCUMENTS

| | | | |
|---|---|---|---|
| 5,712,240 | * 1/1998 | Tyerech et al. | 510/424 |
| 5,714,082 | 2/1998 | Boardman et al. | 252/8.67 |

FOREIGN PATENT DOCUMENTS

| | | |
|---|---|---|
| 31 25 006 | 2/1982 | (DE) . |
| 0 280 115 | 8/1988 | (EP) . |
| 2-255900 | * 10/1990 | (JP) . |
| 7-278162 | * 10/1995 | (JP) . |

OTHER PUBLICATIONS

Derwent Publications, AN 1994–347342, JP 06 271839, Sep. 27, 1994.*
Derwent Publications, AN 1992–245787, JP 04 164990, Jun. 10, 1992.*

* cited by examiner

*Primary Examiner*—Anthony Green
(74) *Attorney, Agent, or Firm*—Oblon, Spivak, McClelland, Maier & Neustadt, P.C.

(57) ABSTRACT

A water and oil repellent composition comprising, as essential components, a phosphate of the following formula 1, a nonionic surfactant made of a compound containing at least one carbon-carbon triple bond and at least one hydroxyl group in its molecule and an aqueous medium:

$$(R^f\text{—}Q\text{—}O\text{—})_m PO(OH)_n(O^-)_{3-m-n} \cdot (Y^+)_{3-m-n} \qquad \text{Formula 1}$$

wherein $R^f$ is a polyfluoroalkyl group, Q is a bivalent organic group, $Y^+$ is a monovalent counter ion, m is an integer of from 1 to 3, and n is an integer of from 0 to 2, provided that (m+n) is 1, 2 or 3.

21 Claims, No Drawings

PHOSPHATE TYPE WATER AND OIL REPELLENT COMPOSITION

BACKGROUND OF THE INVENTION

1. Field of the Invention

The present invention relates to a water and oil repellent composition. The water and oil repellent composition of the present invention is excellent in storage stability, and particularly when applied to paper, it imparts excellent water resistance and sizing property of the paper. Further, when applied to natural leather or synthetic leather, it imparts excellent water resistance and oil resistance thereto.

2. Description of the Background

Heretofore, as a water and oil repellent for paper, an amine salt of a phosphate containing a polyfluoroalkyl group (hereinafter referred to as a $R^f$) has been known, and it has been widely employed in a premixing method wherein it is incorporated during paper making an in a post treatment method wherein it is incorporated during immersion of sheeted paper. However, particularly when the post treatment method is employed, if the treatment is carried out at a high speed by means of a sizing press or a coater, there has frequently been a problem that the water resistance tends to be poor. Further, the water and oil repellent composed mainly of an amine salt of a phosphate containing an Rf group has had a problem that the storage stability is inadequate, and it undergoes a phase separation when stored for a long period of time. Further, there has been a problem such that the performance tends to be poor by an influence of the hardness of water to be used for e.g. dilution, by the presence of impurities or by other processing agents used together, or it forms a precipitate or gum-like substance, which may stain processing rolls.

As a composition for improving the dispersion stability of a water and oil repellent, a composition having a hydrocarbon type anionic surfactant incorporated to an amine salt of a phosphate containing a $R^f$ group (JP-A-64-6196) or a composition having a fluoroaliphatic hydrocarbon or chlorofluoroaliphatic hydrocarbon incorporated to an amine salt of a phosphate containing a $R^f$ group (JP-A-56-138197) has been proposed.

However, when such a conventional composition is applied to paper, a problem has been observed such that the water resistance is inadequate. Further, a problem has been observed such that the storage stability is inadequate, whereby it undergoes a phase separation during storage for a long period of time, or it undergoes phase separation also due to impurities or a processing agent used together.

SUMMARY OF THE INVENTION

It is an object of the present invention to solve the above-mentioned problems and to prove a water and oil repellent composition excellent in storage stability and oil repellency.

Particularly, it is an object of the present invention to provide a water and oil repellent composition, which exhibits excellent performance when applied to paper or leather.

A further object of the present invention is to provide a paper or leather treated with such a water and oil repellent composition.

That is, the present invention provides water and oil repellent composition comprising, as essential components, a phosphate of the following formula 1, a nonionic surfactant made of a compound containing at least one carbon-carbon triple bond and at least one hydroxyl group in its molecule and an aqueous medium:

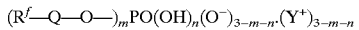

$$(R^f-Q-O-)_m PO(OH)_n (O^-)_{3-m-n} \cdot (Y^+)_{3-m-n} \quad \text{Formula 1}$$

wherein $R^f$ is a polyfuluoroalkyl group, Q is a bivalent organic group, $Y^+$ is a monovalent counter ion, m is an integer of from 1 to 3, and n is 0 or an integer of from 1 to 2, provided that (m+n) is 1, 2 or 3.

DESCRIPTION OF THE PREFERRED EMBODIMENTS

Further, the present invention provides a paper or leather treated with such a water and oil repellent composition.

Now, the present invention will be described in detail with reference to the preferred embodiments.

The water and oil repellent composition of the present invention comprises a phosphate compound of the Formula 1, a nonionic surfactant made of a compound containing at least one carbon-carbon triple bond and at least one hydroxyl group in its molecule (hereinafter referred to as a specific nonionic surfactant), and an aqueous medium, as essential components.

$R^f$ in the formula 1 represents a $R^f$ group. The $R^f$ group is a group having at least two hydrogen atoms of an alkyl group substituted by fluorine atoms. The carbon number of the $R^f$ group is preferably from 2 to 20, particularly preferably from 6 to 16. The $R^f$ group may have a straight chain structure or a branched chain structure, particularly preferably a straight chain structure. In the case of a branched chain structure, it is preferred that the branched moiety is present at a terminal portion of the $R^f$ group; and it is a short chain having from 1 to 4 carbon atoms. The $R^f$ group may contain other halogen atoms than fluorine atoms. As such other halogen atoms, chlorine atoms are preferred.

An etheric oxygen atom or a thioetheric sulfur atom may be inserted between the carbon-carbon bond in the $R^f$ group. The structure of the terminal portion of the $R^f$ group may, for example, be $-CF_2CF_3$, $-CF(CF_3)_2$, $-CF_2H$, $-CFH_2$ or $-CF_2Cl$, preferably $-CF_2CF_3$.

The number of the fluorine atoms in the $R^f$ group is at least 60%, particularly preferably at least 80%, when it is represented by the formula of [(number of fluorine atoms in the $R^f$ group)/(number of hydrogen atoms contained in an alkyl group having the same carbon number as in the $R^f$ group)]× 100 (%). Further, the $R^f$ group is preferably a group having all hydrogen atoms in an alkyl group substituted by fluorine atoms (i.e. a perfluoroalkyl group), or a group having a perfluoroalkyl group at its terminal portion. The carbon number of the perfluoroalkyl group is preferable from 2 to 20, particularly preferably from 6 to 16. If the carbon number is too small, the oil repellency performance tends to be low, and if the carbon number is too large, handling tends to be difficult.

The following groups may be mentioned as specific examples of the $R^f$ group.

$C_4F_9$— [any one of structural isomers such as $F(CF_2)_4$—, $(CF_3)_2CFCF_2$—, $(CF_3)_3C$— and $CF_3CF_2CF(CF_3)$—], $C_5F_{11}$— [such as $F(CF_2)_5$—], $C_6F_{13}$— [such as $(CF_2)_6$—], $C_7F_{15}$— [such as $F(CF_2)_7$—], $C_8F_{17}$— [such as $F(CF_2)_8$—], $C_9F_{19}$— [such as $F(CF_2)_9$—], $C_{10}F_{21}$— [such as $F(CF_2)_{10}$—], $C_{12}F_{25}$— [such as $F(CF_2)_{12}$—], $C_{14}F_{29}$— [such as $F(CF_2)_{14}$—], $C_{16}F_{33}$— [such as $F(CF_2)_{16}$—], $Cl(CF_2)_s$— (wherein s is an integer of from 2 to 16), $H(CF2)_t$— (wherein t is an integer of from 2 to 16), $(CF_3)_2CF(CF_2)_y$— (wherein y is an integer of from 1 to 14), etc.

The following groups may be mentioned as specific examples of the case where the $R_f$ group is a group having an etheric oxygen atom or a thioetheric sulfur atom inserted between the carbon-carbon bond.

$F(CF_2)_5OCF(CF_3)$—, $F[CF(CF_3)CF_2O]_rCF(CF_3)CF_2CF_2$—, $F[CF(CF_3)CF_2O]_zCF(CF_3)$—, $F[CF(CF_3)CF_2O]_uCF_2CF_2$—, $F(CF_2CF_2CF_2O)_vCF_2CF_2$—, $F(CF_2CF_2O)_wCF_2CF_2$— (wherein each of r and z is an integer of from 1 to 10, u is an integer of from 2 to 6, v is an integer of from 1 to 11, and w is an integer of from 1 to 11).

$F(CF_2)_5sCF(CF_3)$—, $F[CF(CF_3)CF_2s]_rCF(CF_3)CF_2CF_2$—, $F[CF(CF_3)CF_2s]zCF(CF_3)$—, $F[CF(CF_3)CF_2s]_uCF_2CF_2$—, $F(CF_2CF_2s)_vCF_2CF_2$—, $F(CF_2CF_2s)_wCF_2CF_2$—, $C_8F_{17}SO_2N(C_2H_5)$— (wherein each of r and z is an integer of from 1 to 10, u is an integer of from 2 to 6, v is an integer of from 1 to 11, and w is an integer of from 1 to 11).

$R^f$ in the Formula 1 is preferably a straight chain perfluoroalkyl group represented by —$(CF_2)_iF$ (wherein i is an integer of from 2 to 20, preferably an integer of from 6 to 16).

M is an integer of from 1 to 3, and n is 0 or an integer of 1 or 2, provided that (m+n) is 1, 2 or 3. M is preferably 1 or 2, and n is preferably 0.

Q is preferably —$CH_2CH_2$— or —$SO_2NR^{10}CH_2CH_2$— (wherein $R^{10}$ is a $C_{1-4}$ alkyl group).

$Y^+$ in the Formula 1 is preferably a cationic monovalent counter ion of the following Formula 2, or an alkali metal cation:

$$[HN(R^1)(R^2)(R^3)]^+ \qquad \text{Formula 2}$$

wherein each of $R^1$, $R^2$ and $R^3$ which may be the same or different from one another, is a hydrogen atom, —$CH_2CH_2OH$, —$CH_2CH_2CH_2OH$, —$CH(CH_3)CH_2OH$ or —$CH_2CH(CH_3)OH$.

The cationic monovalent counter ion of the Formula 2 is preferably one wherein $R^1$ is a hydrogen atom, and each of $R^2$ and $R^3$ is —$CH_2CH_2OH$. The alkali metal cation is preferably $Na^+$ or $K^+$.

The following compounds may be mentioned as specific examples of the phosphate compound of the Formula 1. The structure of the perfluoroalkyl group moiety in the formulae is preferably a perfluoroalkyl group of a straight chain structure, but it may be of a branched chain structure.

$[C_8F_{17}CH_2CH_2O]_2PO(O^-).[N^+H_2(CH_2CH_2OH)_2]$,
$[C_8F_{17}CH_2CH_2O]PO(O^-)_2.[N^+H_2(CH_2CH_2OH)_2]_2$,
$[C_8F_{17}CH_2CH_2O]PO(OH)(O^-).[N^+H_2(CH_2CH_2OH)_2]$,
$[C_6F_{13}CH_2CH_2O]_2PO(O^-).[N^+H_2(CH_2CH_2OH)_2]$,
$[C_6F_{13}CH_2CH_2O]PO(O^-)_2.[N^+H_2(CH_2CH_2OH)_2]_2$,
$[C_{10}F_{21}CH_2CH_2O]_2PO(O^-).[N^+H_2(CH_2CH_2OH)_2]$,
$[C_{10}F_{21}CH_2CH_2O]PO(O^-)_2.[N^+H_2(CH_2CH_2OH)_2]_2$,
$[C_{12}F_{25}CH_2CH_2O]_2PO(O^-).[N^+H_2(CH_2CH_2OH)_2]$,
$[C_{12}F_{25}CH_2CH_2O]PO(O^-)_2.[N^+H_2(CH_2CH_2OH)_2]_2$,
$[C_8F_{17}CH_2CH_2O]_2PO(O^-).[N^+H_4]$,
$[C_8F_{17}CH_2CH_2O]PO(O^-)_2.[N^+H_4]_2$,
$[C_8F_{17}SO_2N(C_2H_5)CH_2CH_2O]_2PO(O^-).[N^+H_2(CH_2CH_2OH)_2]$,
$[C_8F_{17}SO_2N(C_2H_5)CH_2CH_2O]PO(O^-)_2.[N^+H_2(CH_2CH_2OH)_2]_2$,
$[C_8F_{17}CH_2CH_2O]_2PO(O^-).[Na^+]$.

The phosphate compound of the Formula 1 in the water and oil repellent composition may be composed of one type, or two or more types. In the case of two or more types, it may be composed of two or more compounds wherein m or n is different, or may be composed of two or more types of compounds wherein the carbon number of $R^f$ is different.

The specific nonionic surfactant in the present invention is a nonionic surfactant made of a compound having at least one carbon-carbon triple bond and at least one hydroxyl group in its molecule and showing a surface activity.

The specific nonionic surfactant is preferably a nonionic surfactant made of a compound having one carbon-carbon triple bond and one or two hydroxyl groups in its molecule. Further, the specific nonionic surfactant may have a polyoxyalkylene moiety as a partial structure. The polyoxyalkylene moiety may, for example, be a polyoxyethylene moiety, a polyoxypropylene moiety, a moiety having oxyethylene groups and oxypropylene groups connected randomly, or a moiety having polyoxyethylene and polyoxypropylene connected in a block state.

Compounds of the following formulae 3, 4, 5 and 6 are preferred as specific examples of the specific nonionic surfactant.

$HO$—$CR^4R^5$—$C\equiv C$—$CR^6R^7$—$OH$ \qquad Formula 3

$HO$—$(A^1O)_a$—$CR^4R^5$—$C\equiv C$—$CR^6R^7$—$(OA^2)_b$—$OH$ \qquad Formula 4

$HO$—$CR^8R^9$—$C\equiv C$—$H$ \qquad Formula 5

$HO$—$(A^3O)_c$—$CR^8R^9$—$C\equiv C$—$H$ \qquad Formula 6

In the formulae 3 to 6, each of $A^1$, $A^2$, and $A^3$ which may be the same or different from one another, is an alkylene group, and each of a and b is of at least 0, provided that (a+b) is an integer of at least 1. C is an integer of at least 1. When a, b or c is at least 2, each of $A^1$, $A^2$ and $A^3$ may be composed of one type of an alkylene group or two or more types of alkylene groups.

Each of $R^4$, $R^5$, $R^6$, $R^7$, $R^8$ and $R^9$, which may be the same or different from one another, is a hydrogen atom or an alkyl group. The alkyl group is preferably a $C_{1-12}$ alkyl group, particularly preferably a $C_{1-6}$ alkyl group. Specific examples of such a group include a methyl group, an ethyl group, a propyl group, a butyl group and an isobutyl group.

The oxyalkylene moiety is preferably an oxyethylene moiety, an oxypropylene moiety or a combination of both oxyethylene and oxypropylene moieties. The number of oxyalkylene groups in the specific nonionic surfactant is preferably from 1 to 50.

Further, as the specific nonionic surfactant, a nonionic surfactant of the following formula 7 is preferred. In the formula 7, each of x and y is an integer of at least 0. The compounds of the formula 7 may be used alone or in combination as a mixture of two or more of them.

Formula 7

$$HO-(CH_2CH_2O)_x\underset{\underset{CH_3}{|}}{\overset{\overset{(CH_3)_2CHCH_2}{|}}{C}}-C\equiv C-\underset{\underset{CH_2CH(CH_3)_2}{|}}{\overset{\overset{CH_3}{|}}{C}}(OCH_2CH_2)_y-OH$$

As the nonionic surfactant of the formula 7, preferred is a nonionic surfactant wherein the average of the sums of x and y is 10 (which will be referred to as nonionic surfactant (7a) in Examples), a nonionic surfactant wherein x is 0, and y is 0 (which will be referred to as nonionic surfactant (7b) in Examples) or a nonionic surfactant wherein an average of the sums of x and y in the formula 7 is 1.3 (which will be referred to as nonionic surfactant (7c) in Examples).

The aqueous medium may be composed solely of water, or water and a water-soluble organic solvent, preferably composed solely of water.

The amount of the phosphate compound of the formula 1 is preferably from 5 to 30 wt %, particularly preferably from 5 to 20 wt %, in the water and oil repellent composition. The amount of the specific nonionic surfactant is preferably from 0.01 to 20 wt %, particularly preferably from 1 to 10 wt %, relative to the phosphate compound of the formula 1. If the amount of the specific nonionic surfactant is too small, no adequate effects can be obtained, and if it is too much, the stability tends to deteriorate. The amount of the aqueous medium is preferably from 50 to 94.99 wt % in the water and oil repellent composition. One or more than one phosphate compound of the formula 1 may be incorporated in the water and oil repellent composition. Likewise, one or more than one specific nonionic surfactant may be incorporated.

The method for preparation of the water and oil repellent composition of the present invention is not particularly limited. For example, a method wherein the specific nonionic surfactant is added during the preparation of the phosphate compound of the formula 1, a method wherein the specific nonionic surfactant is added during the chlorination of the phosphate compound of the formula 1, a method wherein the specific nonionic surfactant is added at the time of incorporating the phosphate compound of the formula 1 into the aqueous medium, or a method wherein the specific nonionic surfactant is added at the time of adjusting the concentration of the phosphate compound of the formula 1, may be mentioned. In a case where the specific nonionic surfactant is a compound containing active hydrogen atoms, it is preferred to add the specific nonionic surfactant at the time of the incorporation into the aqueous medium or at the time of adjusting the concentration. Further, it is preferred that the composition comprising the phosphate compound of the formula 1, the specific nonionic surfactant and the aqueous medium, is subjected to a method such as stirring to adequately emulsify, disperse or compatibilize the respective components. Here, it is preferred to carry out high pressure emulsification by means of a high pressure emulsifier such as Gaulin homogenizer, hydro shear or microfluidizer, to form an emulsion. The pressure during the high pressure emulsification is preferably from 10 to 500 kg/cm$^2$. Further, when the high pressure emulsification is carried out, the high pressure emulsification efficiency can be improved by carrying out a preliminary dispersing or emulsifying operation, as the case requires. Further, the temperature of the composition during the high pressure emulsification is preferably from 30 to 90° C.

Further, components other than those described above (hereinafter referred to as other additive components) may be preferably incorporated to the water and oil repellent composition of the present invention. Such other additive components include, for example, other water and oil repellents, insecticides, flame retardants, antistatic agents and sizing agents.

The water and oil repellent composition of the present invention may be applied to various substrates to impart excellent water and oil repellency to the surfaces of the substrates. The substrates are not particularly limited, and paper and leather are preferred. The leather may be natural leather or synthetic leather. The water and oil repellent composition of the present invention may be applied to a substrate and dried to present a treated substrate having a coating film derived from the water and oil repellent composition formed on the surface of the substrate. When the treated substrate is a treated paper, excellent sizing properties and water resistance can be imparted to the surface. Further, when the treated substrate is treated leather, particularly excellent water resistance and oil resistance can be imparted.

The mechanism for the improvement in the storage stability of the water and oil repellent composition of the present invention is not clearly understood. However, it is considered that the phosphate compound of the formula 1 and the specific nonionic surfactant mutually interact with each other to homogenize and stabilize the composition.

Now, the present invention will be described in further detail with reference to Examples. However, it should be understood that the present invention is by no means restricted to such specific Examples. Examples 1 to 3 represent Preparation Examples, Examples 4 to 7 represent Working Examples, and Examples 8 and 9 represent Comparative Examples.

EXAMPLE 1

Into a 1 l four-necked flask made of glass equipped with a stirrer, a dropping funnel, a reflux condenser and a thermometer, 120 g of phosphorus oxychloride was charged, and the internal temperature of the reactor was adjusted to 90° C. Then, 605 g of $F(CF_2)_qCH_2CH_2OH$ (comprising one mol % of the compound wherein q is 6, 68 mol % of the compound wherein q is 8, 24 mol % of the compound wherein q is 10, 6 mol % of the compound wherein q is 12, and 1 mol % of the compound wherein q is 14) was dropwise added thereto over a period of 5 hours. Further, 21.7 g of water was dropwise added over a period of 4 hours. A nitrogen stream was circulated for 5 hours to remove hydrogen chloride gas thereby formed.

The reaction product was analyzed by $^{31}$PNMR and found to comprise $P(O)(OH)_3$, $[F(CF_2)_qCH_2CH_2O]P(O)(OH)_2$, $[F(CF_2)_qCH_2CH_2O]_2P(O)OH$ and $[F(CF_2)_qCH_2CH_2O]_3P(O)$ in a molar ratio of 9:35:51:5, respectively.

EXAMPLE 2

Into a 5 l four-necked flask equipped with a stirrer, a dropping funnel, a reflux condenser and a thermometer, 120 g of diethanolamine and 3,120 g of water were charged, and the temperature was adjusted to 90° C. The entire amount of the reaction product obtained in Example 1, was added thereto over a period of one hour. Further, stirring was continued for two hours to obtain a dispersion 1.

EXAMPLE 3

Into a 5 l four-necked flask made of glass equipped with a stirrer, a dropping funnel, a reflux condenser and a thermometer, 120 g of diethanolamine, 20 g of sodium polyethylene glycol lauryl sulfate and 3,120 g of water were charged, and the temperature was adjusted to 90° C. The entire amount of the reaction product obtained in Example 1, was added thereto over a period of one hour. Further, stirring was continued for two hours to obtain a dispersion 2.

EXAMPLE 4

Preparation of Water and Oil Repellent Composition

To 200 g of the dispersion 1 obtained in Example 2, 1.0 g of the nonionic surfactant (7a) was added, and while maintaining the obtained composition at a temperature of from 60 to 70° C., it was emulsified under a pressure of 200 kg/cm$^2$ by means of a high pressure emulsifier (Gaulin homogenizer) to obtain an emulsion 1.

EXAMPLES 5 AND 6

Preparation of Water and Oil Repellent Compositions

An emulsion 2 was prepared in the same manner as in Example 4 except that instead of the nonionic surfactant (7a)

in Example 4, the nonionic surfactant (7b) was added. Further, an emulsion 3 was prepared in the same manner as in Example 4 except that instead of the nonionic surfactant (7a) in Example 4, the nonionic surfactant (7c) was added.

EXAMPLE 7

Preparation of Water and Oil Repellent Compositions

Into a 5 l four-necked flask made of glass equipped with a stirrer, a dropping funnel, a reflux condenser and a thermometer, 120 g of diethanolamine, 20 g of the nonionic surfactant (7a) and 3,120 g of water were charged, and the temperature was adjusted to 90° C. Then, the entire amount of the reaction product obtained in Example 1 was added thereto over a period of one hour. Further, stirring was continued for two hours. Then, while maintaining the temperature within a range of from 60 to 70° C., stirring was continued (stirring rotational speed: 400 rpm) to obtain an emulsion 4.

EXAMPLES 8 AND 9

Preparation of Comparative Compositions

The dispersion 1 obtained in Example 2 and the dispersion 2 obtained in Example 3 were, respectively, stirred at a stirring rotational speed of 400 rpm while maintaining them within a range of from 60 to 70° C. to obtain an emulsion 5 (Example 9) from the dispersion 1 and an emulsion 6 (Example 10) from the dispersion 2.

Application to Paper

Each of emulsions 1 to 6 was diluted to a solid content concentration of 0.5 wt % by an addition of city water having a pH of 6 and used as a treating bath. In this treating bath, non-sized paper (weight: 50 g/m ) was dipped and treated by means of a sizing press at a rate such that the drawing rate was 50%. Then, it was dried for 15 seconds by means of a dryer heated to 80° C. to obtain a treated paper.

Application to Leather

Each of emulsions 1 to 6 was diluted to a solid content concentration of 4 wt % by an addition of city water having a pH of 6. 1 l of the emulsion after dilution was put into a 3 l beaker, and a chrome tunned cattle hide leather of about 200×200 mm was immersed therein and treated at 50° C. for 60 minutes. It was then washed with water and dried, followed by crumpling by a usual method. Then, it was dried at 70° C. for 40 minutes to obtain a treated leather.

Water Resistance Tests on Treated Leathers

Leathers treated with emulsions 1 to 6, respectively, were formed into bags, respectively, and water was put thereinto, and the penetration state of water was visually inspected every one hour up to 48 hours. The time when the penetration of water was observed, is indicated in Table 2.

Oil Resistance Tests on Treated Leathers

The oil resistance was measured by 3M kit test method (TAPPI-RC-338). The 3M kit test method is a test wherein a blended test oil having a composition (unit: ml) as identified in Table 1, is placed on the surface of a treated leather to see if it penetrates into the leather. The evaluation result is represented by a kit number of the test oil, which has penetrated. The larger the numerical value, the superior the oil resistance. Symbol +(−) attached to an oil resistance grade indicates that the relevant evaluation is slightly better (worse). results are shown in Table 2.

TABLE 1

| Kit number | Castor oil | Toluene | Heptane |
|---|---|---|---|
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |
| 13 | 0 | 70 | 130 |
| 14 | 0 | 50 | 150 |
| 15 | 0 | 30 | 170 |
| 16 | 0 | 0 | 200 |

Sizing Property Tests on Treated Papers

With respect to each of emulsions 1 to 6, evaluation of the sizing property was carried out in accordance with the method prescribed in JIS P8122, whereby the Stoeckigt sizing degree (unit: sec) was measured. The larger the value, the superior the sizing property. The results are shown in Table 2.

Storage Stability Tests

Emulsions 1 to 6 were, respectively, charged into comparison tubes made of glass having an inner meter of 20 mm to a height of 30 cm and stored at 30° C. 30 days, whereupon the state of phase separation into layers was inspected, and the proportion (volume %) of the upper transparent layer was measured. The results are shown in Table 2.

TABLE 2

| Emulsion number | Storage stability | Oil resistance | Water resistance | Sizing property |
|---|---|---|---|---|
| 1 | 1.0 | 11 | No penetration | 19.4 |
| 2 | 4.5 | 13 | No penetration | 20.1 |
| 3 | 3.5 | 13 | No penetration | 23.2 |
| 4 | 0.7 | 12 | No penetration | 20.9 |
| 5 | 11.0 | 7− | 14 hours | 12.1 |
| 6 | 11.8 | 8+ | 16 hours | 13. |

The water and oil repellent composition of the present invention has excellent stability and is an excellent water and oil repellent composition, which is hardly susceptible to mechanical or physical influences even when stored for a long period of time. Further, when the composition of the present invention is applied to paper, a sizing property superior to a conventional level can be imparted, and when it is applied to natural leather or synthetic leather, water resistance and oil resistance superior to conventional levels can be imparted.

What is claimed is:

1. A water and oil repellent composition, comprising, as essential components:
   from 5 to 30 wt. % of a phosphate compound of the following formula 1 based on the weight of the composition, and from 0.01 to 20 wt. % of a nonionic surfactant compound containing at least one carbon-carbon triple bond and at least one hydroxyl group in its molecule based on the amount of the phosphate compound with the balance of the composition being an aqueous medium:

$$(R^f-Q-O-)_m PO(OH)_n(O^-)_{3-m-n} \cdot (Y^+)_{3-m-n} \quad \text{Formula 1}$$

wherein $R^f$ is a polyfluoroalkyl group, Q is a bivalent organic group, $Y^+$ is a monovalent counter ion, m is an integer of from 1 to 3, and n is 0 or an integer of 1 or 2, provided that (m+n) is 1, 2 or 3.

2. The water and oil repellent composition according to claim 1, wherein $Y^+$ is a cationic monovalent counter ion of the following formula 2, or an alkali metal cation:

$$[HN(R^1)(R^2)(R^3)]^+ \quad \text{Formula 2}$$

wherein each of $R^1$, $R^2$ and $R^3$ which may be the same or different from one another, is a hydrogen atom, $-CH_2CH_2OH$, $-CH_2CH_2CH_2OH$, $-CH(CH_3)CH_2OH$ or $-CH_2CH(CH_3)OH$.

3. The water and oil repellent composition according to claim 1, wherein the nonionic surfactant is a compound of the following formula 3, 4, 5 or 6:

$$HO-CR^4R^5-C\equiv C-CR^6R^7-OH \quad \text{Formula 3}$$

$$HO-(A^1O)_a-CR^4R^5-C\equiv C-CR^6R^7-(OA^2)_b-OH \quad \text{Formula 4}$$

$$HO-CR^8R^9-C\equiv C-H \quad \text{Formula 5}$$

$$HO-(A^3O)_c-CR^8R^9-C\equiv C-H \quad \text{Formula 6}$$

wherein each of $A^1$, $A^2$ and $A^3$ which may be the same or different from one another, is an alkylene group, each of a and b is at least 0, provided that (a+b) is an integer of at least 1, c is an integer of at least 1, and each of $R^4$, $R^5$, $R^6$, $R^7$, $R^8$ and $R^9$ which may be the same or different from one another, is a hydrogen atom or an alkyl group.

4. The water and oil repellent composition according to claim 1, wherein the amount of the nonionic surfactant is from 1 to 10 wt. %, relative to the phosphate compound.

5. The water and oil repellent composition according to claim 1, wherein $R^f$ in the formula 1 is a $C_{4-16}$ perfluoroalkyl group.

6. A method of treating paper or leather, comprising:
treating paper or leather material with the water and oil repellent composition according to claim 1.

7. A paper or leather treated by the method according to claim 6.

8. The water and oil repellent composition according to claim 2, wherein the nonionic surfactant is a compound of the following formula 3, 4, 5 or 6:

$$HO-CR^4R^5-C\equiv C-CR^6R^7-OH \quad \text{Formula 3}$$

$$HO-(A^1O)_a-CR^4R^5-C\equiv C-CR^6R^7-(OA^2)_b-OH \quad \text{Formula 4}$$

$$HO-CR^8R^9-C\equiv C-H \quad \text{Formula 5}$$

$$HO-(A^3O)_c-CR^8R^9-C\equiv C-H \quad \text{Formula 6}$$

wherein each of $A^1$, $A^2$ and $A^3$ which may be the same or different from one another, is an alkylene group, each of a and b is at least 0, provided that (a+b) is an integer of at least 1, c is an integer of at least 1, and each of $R^4$, $R^5$, $R^6$, $R^7$, $R^8$ and $R^9$ which may be the same or different from one another, is a hydrogen atom or an alkyl group.

9. The water and oil repellent composition according to claim 2, wherein $R^f$ in the formula 1 is a $C_{4-16}$ perfluoroalkyl group.

10. A method of treating paper or leather, comprising:
treating paper or leather material with the water and oil repellent composition according to claim 2.

11. A paper or leather treated by the method according to claim 10.

12. The water and oil repellent composition according to claim 8, wherein the amount of the nonionic surfactant is from 1 to 10 wt. %, relative to the phosphate compound.

13. The water and oil repellent composition according to claim 8, wherein $R^f$ in the formula 1 is a $C_{4-16}$ perfluoroalkyl group.

14. A method of treating paper or leather, comprising:
treating paper or leather material with the water and oil repellent composition according to claim 8.

15. A paper or leather treated by the method according to claim 14.

16. The water and oil repellent composition according to claim 12, wherein $R^f$ in the formula 1 is a $C_{4-16}$ perfluoroalkyl group.

17. A method of treating paper or leather, comprising:
treating paper or leather material with the water and oil repellent composition according to claim 12.

18. A paper or leather treated by the method according to claim 17.

19. A method of treating paper or leather, comprising:
treating paper or leather material with the water and oil repellent composition according to claim 16.

20. A paper or leather treated by the method according to claim 16.

21. A paper or leather treated by the method according to claim 19.

* * * * *